US009819656B2

(12) United States Patent
Carlson

(10) Patent No.: US 9,819,656 B2
(45) Date of Patent: Nov. 14, 2017

(54) METHOD FOR SECURE COMMUNICATION USING ASYMMETRIC AND SYMMETRIC ENCRYPTION OVER INSECURE COMMUNICATIONS

(71) Applicant: Sony Interactive Entertainment Inc., Tokyo (JP)

(72) Inventor: Jay Alan Carlson, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 100 days.

(21) Appl. No.: 14/274,502

(22) Filed: May 9, 2014

(65) Prior Publication Data
US 2015/0326547 A1 Nov. 12, 2015

(51) Int. Cl.
*H04L 29/06* (2006.01)
*H04L 9/08* (2006.01)

(52) U.S. Cl.
CPC .......... *H04L 63/045* (2013.01); *H04L 9/0825* (2013.01); *H04L 63/0435* (2013.01); *H04L 63/0442* (2013.01); *H04L 63/061* (2013.01); *H04L 2463/062* (2013.01)

(58) Field of Classification Search
CPC .... H04L 9/0825; H04L 9/0816; H04L 9/0819
USPC ...................... 713/150, 168, 171
See application file for complete search history.

(56) References Cited

U.S. PATENT DOCUMENTS

| | | | | |
|---|---|---|---|---|
| 7,039,809 B1* | 5/2006 | Wankmueller | ....... | G06Q 20/401 705/72 |
| 8,024,582 B2* | 9/2011 | Kunitz | ............... | G06F 21/6218 380/277 |
| 8,255,684 B2* | 8/2012 | Benshetler | .......... | H04L 63/0823 713/153 |
| 8,266,421 B2* | 9/2012 | Sidman | ............ | H04L 29/12386 380/255 |
| 2003/0108205 A1* | 6/2003 | Joyner | .................. | H04L 9/0618 380/277 |
| 2004/0175000 A1* | 9/2004 | Caronni | ............. | G06F 21/6218 380/285 |
| 2006/0129818 A1* | 6/2006 | Kim | .................... | H04L 63/0442 713/171 |
| 2013/0111196 A1* | 5/2013 | Pasam | .................. | G06F 21/575 713/1 |

OTHER PUBLICATIONS

An ID-based broadcast encryption scheme for key distribution, Du et al, IEEE 2005, IEEE Transactions on Broadcasting ( vol. 51, Issue: 2, Jun. 2005 ), 10.1109/TBC.2005.847600.*

(Continued)

*Primary Examiner* — Jahangir Kabir
(74) *Attorney, Agent, or Firm* — JDI Patent; Joshua D. Isenberg; Robert A. Pullman

(57) ABSTRACT

Data may be protected using a combination of symmetric and asymmetric cryptography. A symmetric key may be generated and the data may be encrypted with the symmetric key. The symmetric key and a only a portion of the symmetrically encrypted data may then be encrypted with an asymmetric public key. The entire set of encrypted data, including the asymmetrically encrypted symmetric key, the doubly encrypted portion of data, and the remainder of the symmetrically encrypted data may then be sent to a remote device using insecure communications.

9 Claims, 4 Drawing Sheets

(56) References Cited

OTHER PUBLICATIONS

Hybrid cryptosystem—Wikipedia, the free encyclopedia http://en.wikipedia.org/wiki/Hybrid_cryptosystem, downloaded from the internet on Mar. 9, 2014.
"Hashing definition", SearchSQLServer, Tech Target. Sep. 2005. Internet, accessed Jan. 14, 2016. http://searchsqlserver.techtarget.com/definition/hashing.
"Hashing is Not Encryption", Tankersley, Chris. Oct. 14, 2009. Internet, accessed Jan. 14, 2016. http://ctankersley.com/2009/10/14/hashing-is-not-encryption/#comment-1032760665.
"Hashing vs. Encryption", Jackson, William. Dec. 2, 2013. GCN. Internet, accessed Jan. 14, 2016. https://gcn.com/articles/2013/12/02/hashing-vs-encryption.aspx.
"What's the Difference Between Hashing and Encryption", Pearson, Allen. Dec. 18, 2014. Security Innovation Europe Blog. Internet, accessed Jan. 14, 2016. http://www.securityinnovationeurope.com/blog/whats-the-difference-between-hashing-and-encrypting.

* cited by examiner

METHOD FOR SECURE COMMUNICATION USING ASYMMETRIC AND SYMMETRIC ENCRYPTION OVER INSECURE COMMUNICATIONS

FIELD

Aspects of the present disclosure relate to cryptography and data transmission over a network.

BACKGROUND

Securely transmitting data is a critical task when attempting to exchange sensitive data between remote devices over a network. One way to ensure secure data transmission is by establishing a secure channel using HTTPS or a similar secure protocol. Unfortunately, those libraries increase executable code size and network overhead for all transactions. It would be desirable to provide a way to securely transmit data between remote devices through an insecure channel, without the overhead and other drawbacks associated with HTTPS and similar secure transmission protocols.

Broadly speaking, cryptography provides a way to conceal data in such a manner that, even if intercepted by a nefarious third party, the underlying data cannot be consumed without being deciphered. Cryptography typically relies on mathematical algorithms that modify the underlying data to be protected in such a manner that it is impossible or computationally impractical to decipher the encrypted data without a key associated with the encryption of that particular set of data.

Encryption can be classified under two general types, symmetric cryptography and asymmetric cryptography (sometimes known as public key cryptography).

Symmetric encryption, such as that used in data encryption standard (DES), advanced encryption standard (AES), and the like, relies on the same keys for both the encryption and decryption of data. The symmetric keys may be exactly identical, or be the same insofar as only a simple transformation is required to get from one key to the other. One of the main drawbacks associated with symmetric cryptography is the requirement for the symmetric keys to remain secret to only the encrypting and decrypting devices, since knowledge of the symmetric keys renders the underlying data easily decipherable. Secrecy may be accomplished by setting up a secure channel for delivery of the symmetric keys to each of the remote devices, or by some other delivery process that ensures secrecy of the keys. Since the symmetric key is often changed with each set of data or each transmission session to ensure security, key management becomes a difficult process, and it may be impractical to securely transmit a new symmetric key to the two remote devices with each session. Moreover, while the symmetric encryption process is typically less computationally demanding than a comparable asymmetric process, the resulting encrypted data is also easier to decipher without the key.

By contrast, asymmetric encryption, such as Rivest-Shamir-Adelman (RSA), relies on two asymmetric keys, known as a public key and private key pair. The two keys are different but mathematically linked in such a manner that it is computationally infeasible to determine the private key with knowledge of only the public key. The public key may be published freely and used to encrypt the data, while the private key is kept secret and used for decryption. Unfortunately, asymmetric encryption is a computationally hard process that may be very time consuming for encryption of relative large sets of data.

There are some hybrid crypto systems that attempt to balance the two approaches by first encrypting the data with a symmetric key, then encrypting only that symmetric key with an asymmetric key. Because the symmetric key is encrypted with a separate asymmetric key and delivered to the recipient device, along with the symmetrically encrypted data, a symmetric key does not need to be separately delivered to recipient device for decryption, thereby somewhat easing the key management burden. However, with these conventional hybrid approaches, the underlying data has only been encrypted with the symmetric key and may still be vulnerable, particularly in situations involving the repetitive transmission of common data, since even generating a new symmetric key each time does not completely prevent patterns across the repeated data from being exploited by a nefarious third party.

It is within this context that the present disclosure arises.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
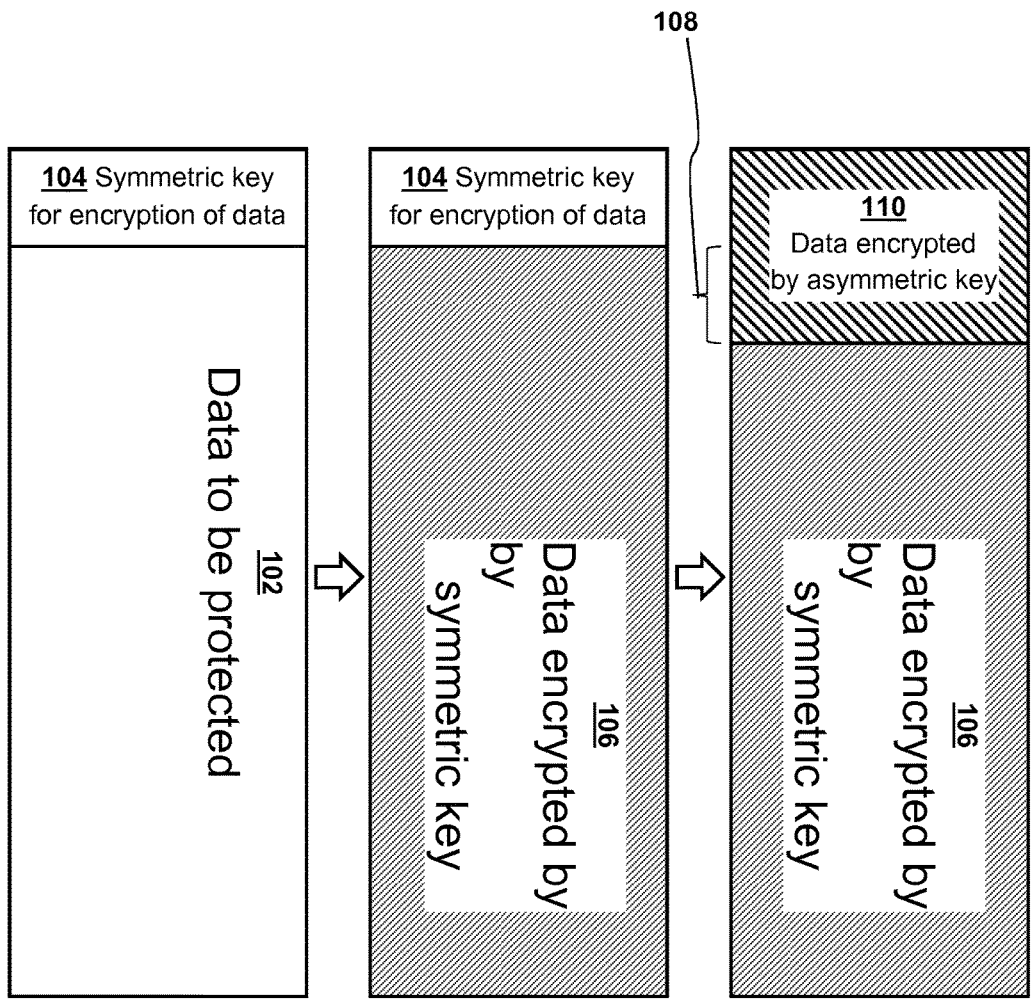
FIG. 1 depicts a process flow diagram of encrypting data in accordance with aspects of the present disclosure.

Implementations of the present disclosure provide a way to securely transmit data between remote devices through an insecure connection, using a combination of asymmetric and symmetric cryptography. An illustrative implementation of the present disclosure is depicted in FIG. 1. The process depicted in FIG. 1 involves encrypting a set of data 102 in a manner that may allow it to be securely sent over a network using an insecure connection.

The data to be protected 102 may first be encrypted using a symmetric key 104 in order to generate encrypted data 106. The symmetric key 104 may be a one-time key, e.g., a single use session key. Upon encrypting the data with the symmetric key, the symmetric key 104 as well as a portion 108 of the previously encrypted data 106 is encrypted with an asymmetric key. In certain implementations, the asymmetric key may be an RSA public key of an RSA public key/private key pair.

As shown in FIG. 1, the data encrypted by the asymmetric key 110 includes a portion 108 of the data 106 that was encrypted by the symmetric key, as well as the symmetric key 104. Encrypting a portion 108 of the data as well as the symmetric key may add to the randomness of the encryption and add to the complexity of the decryption for any nefarious third party. However, it would take a very long time to encrypt all of that data using an asymmetric key, so in implementations of the present disclosure, only a portion of the data 106 is encrypted with the asymmetric data.

It is noted that the data to be protected 102 may potentially be any data that is sent over an insecure link. By way of example, and not by way of limitation, the data may be email, instant messages, data backup, photo uploads, business presentations, and the like.

In certain implementations, the data to be protected 102 may also be salted in order to further randomize the data. For example in certain implementations, the salt may be specifically added to the beginning of the data to be protected 102 or at least a portion of the part of data 108 where it is also later asymmetrically encrypted. This may be particularly desirable in implementations involving data that is repeatedly sent if only a single symmetric key is used across different instances of data transmission. By way of example, and not by way of limitation, data that might be repeatedly sent may include status of a machine, e.g., operating configuration and status, etc.

The size of the data to be encrypted and the size of encryption keys used may depend on the particular implementation involved. Broadly speaking, a larger sized encryption key may provide a more difficult to decipher encrypted set of data, but at the expense of a longer time to perform the computations required to encrypt the data. Moreover, generally speaking, the size of the asymmetric public key corresponds to the size of the data that will be encrypted by the public key, e.g., a 512 byte public key may be used to encrypt 512 bytes of data.

Implementations of the present disclosure may use asymmetric keys that are larger than the symmetric key that is used for the initial encryption and that is subsequently encrypted with the public key, such that the remainder of the key is available to encrypt a portion of the symmetrically encrypted data. By way of example, and not by way of limitation, a 64 byte symmetric key 104 may be used to initially encrypt all of the data to be protected 102 (which may be any size), while the asymmetric public key may be larger, e.g., 128 bytes, 256 bytes, or 512 bytes, to encrypt a 64 byte portion, 192 byte portion, or 448 byte portion of the symmetrically encrypted data, respectively. More generally, in various implementations of the present disclosure, the ratio of the symmetric key size to the asymmetric key size may be ½, ¼, ⅛, or another ratio where the symmetric key is smaller than the asymmetric key so that the asymmetric key may be used to encrypt the entire symmetric key as well as a portion of symmetrically encrypted data to be protected.

While there may be no upper limit to the total amount of data that may be encrypted in implementations of the present disclosure, the underlying data 102 should be at least as large as the difference between the size of the symmetric and asymmetric keys (e.g., if the symmetric key is 64 bytes and the public asymmetric key is 128 bytes, the data to be protected should be greater than 64 bytes to make up the difference). Alternatively, the data to be protected 102 may be padded out to be at least as large, using simply 1s or 0s, or random salt data.

Figure 2:
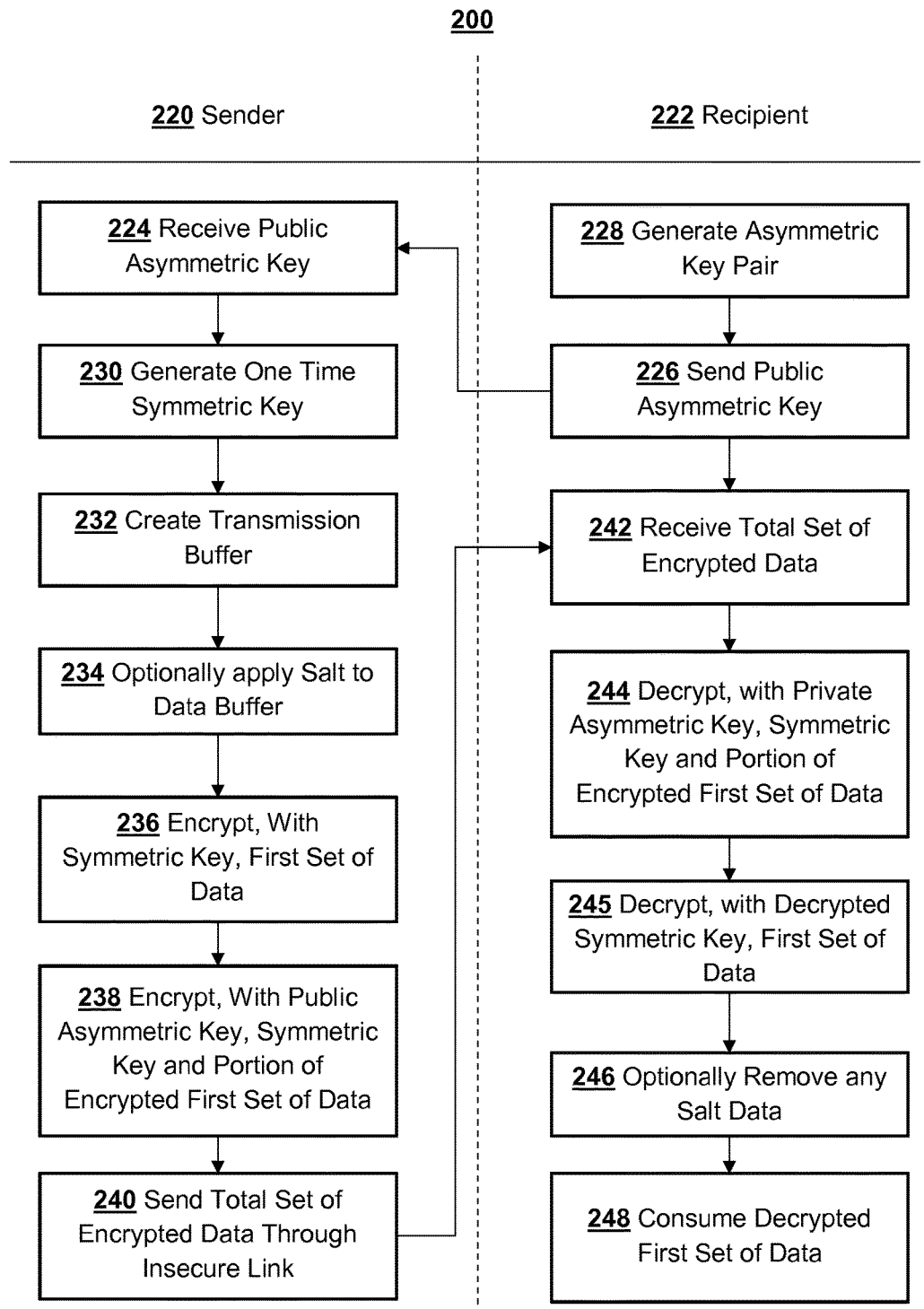
FIG. 2 depicts a flow diagram of a method of encryption, transmission, and decryption of data between remote devices in accordance with aspects of the present disclosure.

Turning now to FIG. 2, an illustrative method 200 of encrypting data and sending it over a network is depicted according to aspects of the present disclosure. The illustrative method 200 depicted in FIG. 2 involves a sender computing device 220 encrypting data to be protected (referred to as a first set of data) so that it may be sent to a recipient computing device 222, which may then decrypt and consume the data. The sender 220 may encrypt the data using a process similar to that shown and described with respect to FIG. 1.

In order to encrypt the data, the sender 220 needs to receive a public key of an asymmetric key pair, as indicated at 224. The client may receive the asymmetric key in a variety of ways in different implementations of the present disclosure. In some implementations, it may be baked into the sender device 220 upon release. Alternatively, the public key may be sent to the sender device over a network, as indicated at 226, and as shown in the illustrated example.

In the illustrated example, the recipient device is configured to generate the asymmetric key, as indicated at 228, as well as send the public key to the sender 220. Since the private key needs to be kept secret, it is preferable that the recipient device generates the asymmetric key pair, so that it may freely transmit the public key while maintaining the private key in secret for later decryption. However, this is not strictly necessary, and it may be possible to use some third party to generate the asymmetric key pair and securely provide the key pair to the sender 220 and recipient 222 devices in some manner.

It is noted that the asymmetric key used by the sender 220 to encrypt the portion of data may be a public key, such as an RSA public key, that may be freely published without fear of determining the corresponding private key for decryption from the public key. Accordingly, in certain implementations, sending the public key 226 may be performed through an insecure channel of the network. However, it is still desirable to ensure the authenticity of the source of the public key and ensure that it corresponds to the private key held secretly by the recipient 222. Otherwise, a nefarious third party would be able to fraudulently generate its own asymmetric key pair and transmit a public key to the sender so that it would be able to easily intercept and decrypt the resulting data from the sender 220.

Accordingly, in certain implementations of the present disclosure, the public key may actually be sent through a secure channel, e.g., established from recipient 222 to sender 220. Alternatively, it may be sent through an insecure communication link, but the data corresponding to the public key may be cryptographically signed to ensure authenticity of the source. This may involve some trusted third party (not pictured) which receives the public key generated by the recipient and sends the public key to the sender device with a digital signature that verifies its source as being the recipient 222.

In addition to obtaining the public key, the sender 220 may also obtain a symmetric key that may be used to encrypt the entire first set of data. The symmetric key may be independently generated by the sender, as indicated at 230, according to some key generation algorithm. Since the symmetric key generated by the sender will itself be encrypted with the asymmetric key and will be transmitted in encrypted form to the recipient along with the encrypted data intended for consumption, burdensome key management solutions may be avoided. In certain implementations, the symmetric key generated at 230 may be a single use key that may be used to encrypt only that particular first set of data.

To encrypt and send the first set of data, using the independently generated symmetric key and the received public key, the sender may generate a buffer for transmission, as indicated at 232. Optionally, the sender may add salt, e.g., random data, to the data in order to further randomize it, as indicated at 234. The sender may then symmetrically encrypt the entire first set of data (which may include optional salt), using the symmetric key, as indicated at 236. In certain implementations, the salt may be added to a portion that at least partially overlaps with the portion that will later be asymmetrically encrypted with the public key, e.g., a portion the beginning of the first set of data. Accordingly, in certain implementations of the present disclosure, at least part of the salt data may become doubly encrypted after encryption with the asymmetric key, as described below.

Next, as indicated at 238, the sender may encrypt the symmetric key as well as a portion of the symmetrically encrypted first set of data using the public key received at 224. The entire resulting set of encrypted data may thus include an asymmetrically encrypted symmetric key, a doubly encrypted portion of the first set of data that is both symmetrically encrypted and asymmetrically encrypted, and a remainder of symmetrically encrypted first set of data. This total resulting set of encrypted data may then be sent to the recipient device, as indicated 240.

Upon receiving the encrypted data, as indicated at 242, the recipient 222 may then decrypt the data using the private key of the previously mentioned asymmetric key pair. Specifically, the recipient may decrypt not only the symmetric key, but also the asymmetrically encrypted portion of the first set of data, as indicated, at 244. Since the asymmetrically encrypted portion of the first set of data was also symmetrically encrypted at 236, this results in this doubly encrypted portion of data being only partially decrypted. The recipient may then decrypt the first set of data using the decrypted symmetric key, as indicated at 245.

In certain implementations, where salt is added by the sender 220 to further randomize the data to be protected, the recipient 222 may also be configured to remove the salt from the decrypted first set of data, as indicated at 246. Removing the salt may be based on knowledge at the recipient of how much salt was added to the data as well as where it was added, e.g., how many bits of data were added and would need to be removed by the recipient. The recipient may know how to remove the salt based on, for example, some pre-determined amount or based on a separate communication between the sender and the recipient. After the total set of data has been decrypted, and optional salt has been removed, the data may be exposed for consumption by the recipient, as indicated at 248.

The process 200 of encrypting and sending data illustrated in FIG. 2 corresponds to a single instance of data transmission, e.g., a single payload containing the asymmetrically encrypted symmetric key, the doubly encrypted portion of the set of data, and the symmetrically encrypted remainder of the set of data. However, implementations of the present disclosure may involve the repetitive sending of bulk data. In each instance, a new single-use symmetric key may be generated by the sender, as indicated at 230 however, the same asymmetric key may be used for encryption of the symmetric key and data portions across a plurality of instances of data transmission, e.g., as indicated at 238.

Moreover, in certain implementations, a plurality of sets of data that are sent in different instances may include at least a portion that contains common data across the plurality of sets of data, i.e., across the different instances of data transmission. For example, the process may involve data transmission implemented in a telemetry system where the remote sender 220 is a client device and the recipient 222 is a server, and the telemetry may involve repetitive transmission of some set of data that is unchanged or only minimally changed between repetitions. By way of example, and not by way of limitation, sets of data that may include at least some common part across instances include status of a machine (e.g., operating configuration and/or status), or some other type of data.

With conventional cryptosystems, patterns across this repetitive data might be exploited if the data to be protected is only symmetrically encrypted, or if no salt is added. For example, when repeatedly sending static data, such as machine status or user credential information (things that may not change), the data may be vulnerable to attack by a nefarious third party if the general format of the data is known. Using user credential information as an example, if a nefarious third party knows that the first x number of bytes are a name of the user, the next y bytes are an employer, etc., this knowledge of general format leaves the data susceptible to a brute force attack, particularly where a common key is used across different instances of the data. By further asymmetrically encrypting a portion of the symmetrically encrypted data, as well as by further adding salt to the data (especially adding salt to the portion of the symmetrically encrypted data that becomes the doubly encrypted portion), the randomness of the encrypted data may be significantly increased to better protect the data from a nefarious third party.

Figure 3:
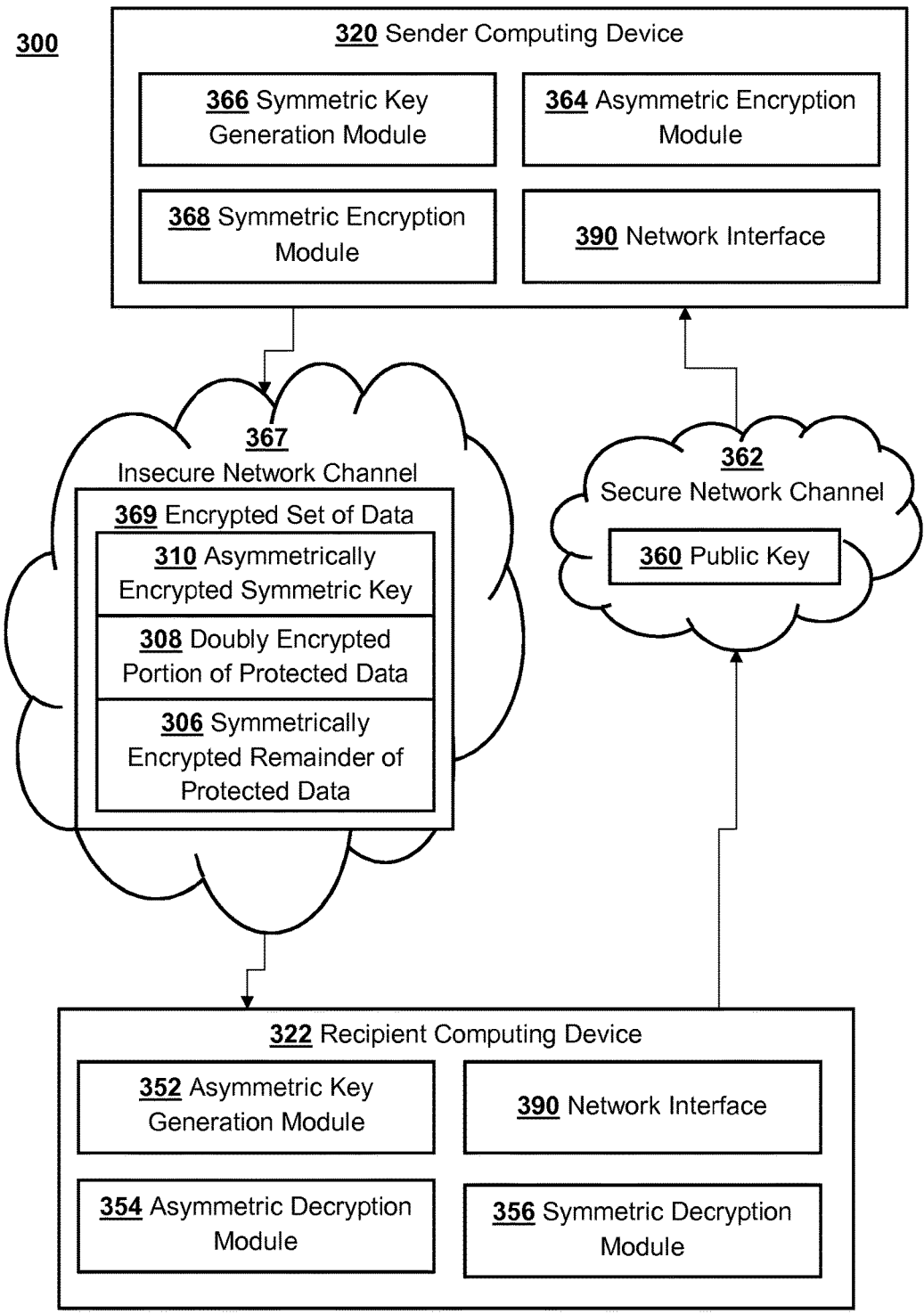
FIG. 3 depicts a schematic diagram of a computing system having a plurality of remote computing devices in accordance with aspects of the present disclosure.

FIG. 3 depicts an illustrative computing system 300 that includes a sender computing device 320 and a recipient computing device 322 configured to implement data transmission and cryptography in accordance with aspects of the present disclosure. The system of FIG. 3 may be configured to implement a method of cryptography and data transmission having one or more features in common with the illustrative method 200 depicted in FIG. 2.

In the illustrated implementation, each of the sender device 320 and recipient device 322 may be remotely located and include a network interface 390 to facilitate the exchange of data communications over a network, such as the internet or any LAN or WAN, and, as such, the computing system 300 may be a distributed computing system.

In certain implementations, the recipient device may include an asymmetric key generation module 352 so that it may independently generate an asymmetric public key/private key pair in accordance with aspects of the present disclosure. The asymmetric key generation module 352 may be configured to generate a key pair in according to any of a variety of asymmetric algorithms, such as RSA, DSS, ElGamal, elliptic curve algorithms, Paillier, Cramer-Shoup, or another suitable asymmetric algorithm where the private key is not feasibly deducible from the public key. The recipient device 322 may be configured to send the public key 360 of the generated asymmetric key pair to the sender computing device 320.

Since the private key used for decryption cannot feasibly be deduced from the public key 360, the recipient device 322 may be configured to send the public key 360 using an insecure communication channel. However, it is preferable to send the public key in a manner that ensures authenticity of the source of the asymmetric public key. Therefore, in the illustrated example of FIG. 3, the public key 360 is sent from the recipient device 322 to the sender device 320 using a secure network channel 362, such as HTTPS communications. In alternative implementations, the public key may be exchanged using insecure communications, but it may be cryptographically signed to ensure authenticity of the recipient device 322 as the source. In yet further implementations, the public key may simply be baked into the sender device 320 so that the asymmetric public key does not have to be sent over the communications network.

The illustrated implementation depicts the asymmetric key pair as being generated by the recipient device 322, which may simplify key management for purposes of the recipient device 322 maintaining the secrecy of the private key used for decryption, since this key does not need to be separately transmitted to the recipient device. However, in other implementations of the present disclosure the key generation module 352 may be omitted from the recipient device 322, and the asymmetric key pair may be generated by some other third party so that the private key may be securely provided to the recipient device 322 in some other fashion.

In the illustrated implementation, the sender device 320 may include an asymmetric encryption module 364 configured to encrypt data using the public key 360 of the asymmetric key pair. The sender device may also include a symmetric key generation module 366 configured to generate symmetric keys used for encrypting each set of data to be protected, and a symmetric key encryption module 368 configured to encrypt the data to be protected using the symmetric keys generated by the sender device 320. The symmetric key module 366 may be configured to generate a key pair in accordance with any of a variety of symmetric algorithms, such as AES, DES, or another suitable symmetric algorithm where the keys used for encryption and decryption are the same.

In certain implementations, the symmetric key generation module 366 may include a pseudorandom key generator configured to generate a new single use key for each set of data to be encrypted and sent to the recipient device 322. The sender device may be configured to encrypt each new set of data using the single use key generated with the symmetric key generation module 366, then encrypt the symmetric key and a portion of the symmetrically encrypted data with the public key 360 using the asymmetric encryption module 364. In certain implementations, the sender device 320 may be configured to generate a new symmetric key for each set of data to be protected, while using the same public key across a plurality of sets of data. In some implementations, the plurality of sets of data may include at least a portion of data that is common across two or more of the plurality of sets of data. Encrypting the portion of the data asymmetrically further randomizes the data and avoids patterns across the sets of data that might otherwise be exploited if each set of data were only symmetrically encrypted. Optionally, the sender device may also include a salting module (not pictured) in order to add additional data to each set of data to be protected prior to encryption, in order to further randomize the data.

The sender device 320 may be configured to send the total set of encrypted data 369 to the recipient device 322, as shown in FIG. 3. The total set of encrypted data 369 may include the set of data to be protected and a symmetric key, which may make up the payload of a data packet sent over a network. More specifically, using a scheme in accordance with aspects of the present disclosure, the entire set of encrypted data may include an asymmetrically encrypted symmetric key 310, and the set of data to be protected may include a double encrypted portion 308 that is both symmetrically and asymmetrically encrypted, as well as a remainder 306 that is only symmetrically encrypted. The encryption may provide suitable protection so that the entire set of data may be sent using an insecure communications 367, as shown in FIG. 3, thereby avoiding overhead and high network bandwidth associated with secure libraries such as HTTPS.

The recipient device 322 may include an asymmetric decryption module 354 configured to decrypt data encrypted with the public key using the private key of the asymmetric key pair. In particular, the recipient device 322 may be configured to decrypt the asymmetrically encrypted symmetric key 310 and partially decrypt the doubly encrypted portion 308 that may be received from the sender device 320, as shown in FIG. 3. The recipient device 322 may also include a symmetric decryption module 356 to decrypt the symmetrically encrypted set of data after the asymmetric decryption, using the decrypted symmetric key that was received from the sender device 320.

The above described modules with reference FIG. 3 may be implemented in hardware, software, firmware, or any combination thereof.

In certain implementations, the sender device 320 and the recipient device 322 may be in a client/server relationship. By way of example, and not by way of limitation, the computing system 300 may be used for telemetry with the recipient computer device 322 in a server role for telemetry data gathered by the sender device client 320. Since the telemetry data may include repetitive data, such as machine status (e.g., configuration/operation values) that may have a common part across different sets of data, which may result in patterns across sets of data that could be exploited by a nefarious third party, the cryptography scheme described herein provides a way to protect that data without requiring a secure channel.

Figure 4:
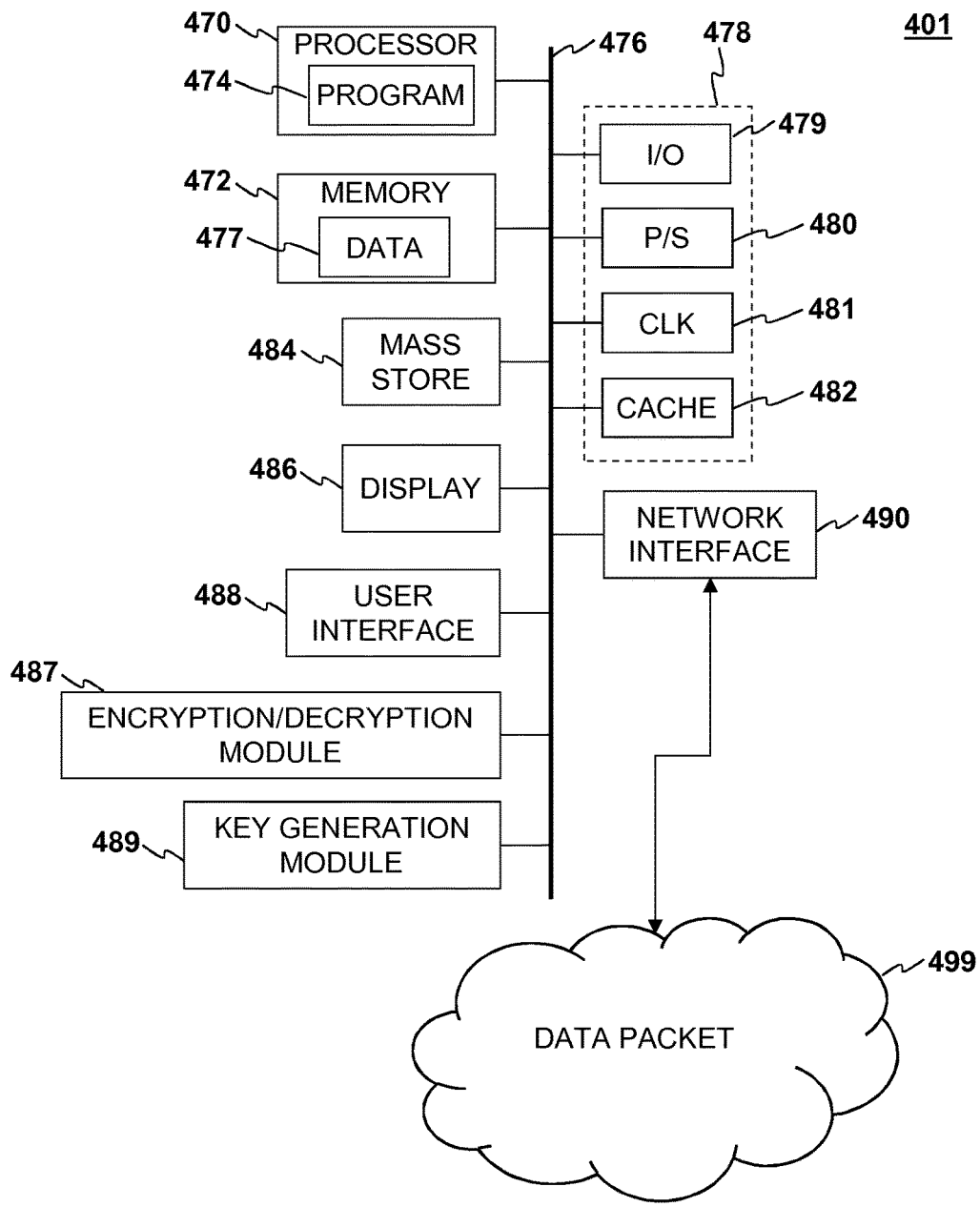
FIG. 4 depicts a schematic diagram of a computing device in accordance with aspects of the present disclosure.

FIG. 4 depicts a detailed schematic of an illustrative computing device 401 configured to implement one or more aspects of the present disclosure. The system 401 may share one or more features in common with the computing devices of FIG. 3, including the sender device 320, the recipient device 322, or both.

The system 401 may be a server, client, embedded system, mobile phone, personal computer, tablet computer, portable game device, workstation, game console, and the like. The system 401 may include one or more processor units 470, which may be configured according to well-known architectures, such as, e.g., single-core, dual-core, quad-core, multi-core, processor-coprocessor, cell processor, and the like. The system 401 may also include one or more memory units 472 (e.g., RAM, DRAM, ROM, and the like). The processor unit 470 may execute one or more programs 474, portions of which may be stored in the memory 472, and the processor 470 may be operatively coupled to the memory 472, e.g., by accessing the memory via a data bus 476. The memory unit 472 may include data 477, and the processor unit 470 may utilize the data 477 in implementing the program 474. The program 474 may include processor executable instructions stored in a non-transitory computer readable medium that, when executed by the processor 470, perform one or more operations associated with cryptography and data transmission in accordance with aspects of the present disclosure.

The device 401 may include an encryption module and/or a decryption module 487 for encrypting or decrypting data in accordance with aspects of the present disclosure. The device 401 may also include an asymmetric and/or symmetric key generation module 489 for generating keys used for encryption/decryption of data. The data 477 may include unencrypted data configured to be encrypted with an encryption module 487 and/or the data 477 may include encrypted data configured to be decrypted with a decryption module 487.

The system 401 may also include well-known support circuits 478, such as input/output (I/O) circuits 479, power supplies (P/S) 480, a clock (CLK) 481, and cache 482, which may communicate with other components of the system, e.g., via the bus 476. The system 401 may optionally include a mass storage device 484 such as a disk drive, Blu-ray, DVD or CD-ROM drive, tape drive, flash memory, or the like, and the mass storage device 484 may store programs and/or data. The system 401 may also optionally include a display unit 486. The display unit 486 may be in the form of a cathode ray tube (CRT), flat panel screen, touch screen, or other device that displays text, numerals, graphical symbols, or other visual objects. The system 401 may also include a user interface 488 to facilitate interaction between the system 401 and a user. The user interface 488 may include a keyboard, mouse, light pen, game control pad, touch interface, or other device. The user interface may also include an audio I/O device, such as a speaker and/or microphone.

A user may interact with the computer system through the user interface 488. Portions of the user interface 488 may include a graphical user interface (GUI) that can be displayed on the display unit 486 in order to facilitate user interaction with the system 401. The system 401 may include a network interface 490, configured to enable the use of Wi-Fi, an Ethernet port, or other communication methods. The network interface 490 may incorporate suitable hardware, software, firmware, or some combination thereof to facilitate communication via a telecommunications network. The network interface 490 may be configured to implement wired or wireless communication over local area networks and wide area networks such as the Internet. The system 401 may send and receive data and/or requests for files via one or more data packets 499 over a network. The data 499 transmitted over the network may include cryptography keys and/or encrypted data, e.g., as described above with respect to FIG. 3. The data 499 sent over the network may be exchanged or accessed by one or more other network connected computing devices (not pictured) in order to implement aspects of the present disclosure in a distributed computing environment over a network.

Various ones of these components may be implemented in hardware, software, firmware, or some combination thereof. For example, in certain implementations, some or all of the encryption/decryption module 487 and/or the key generation module 489 may be implemented in the program 474 in the form of processor executable instructions that may be stored in a non-transitory computer readable medium. By way of further example, in other implementations, some or all of the encryption/decryption module 487 and/or the key generation module 489 may be implemented as hardware modules in the form of one or more FPGAs, ASICS, and the like. By way of further example, some combination of the forgoing may be used, where a portion of the computations needed to perform a method in accordance with the present disclosure may be implemented in hardware and another portion of the computations may be implemented in software.

Additional Aspects of the Present Disclosure

An aspect of the present disclosure is a method of encrypting a set of data with a first computing device, the method comprising: generating a symmetric key; encrypting the set of data with the symmetric key, thereby converting the set of data into a set of symmetrically encrypted data; and encrypting the symmetric key and a portion of the symmetrically encrypted data with a public key of an asymmetric key pair, thereby converting the symmetric key into an asymmetrically encrypted symmetric key, thereby converting the portion of the symmetrically encrypted data into a portion of doubly encrypted data, and thereby generating a total set of encrypted data, the total set of encrypted data comprising the asymmetrically encrypted symmetric key, the portion of doubly encrypted data, and a remainder of symmetrically encrypted data.

Another aspect of the present disclosure is a method of decrypting a total set of encrypted data with a second computing device, the total set of encrypted data comprising an asymmetrically encrypted symmetric key, a portion of doubly encrypted data, and a remainder of symmetrically encrypted data, wherein the method comprises: decrypting the asymmetrically encrypted symmetric key and the portion of doubly encrypted data with a private key of an asymmetric key pair, thereby converting the asymmetrically encrypted symmetric key into a decrypted symmetric key, thereby converting the portion of doubly encrypted data into a partially decrypted symmetrically encrypted portion of data; and decrypting the partially decrypted symmetrically encrypted portion of data and the remainder of symmetrically encrypted data with the symmetric key.

Yet another aspect of the present disclosure is a system comprising: a processor, a memory, and instructions embodied in the memory and executable by the processor to perform the forgoing method of encrypting a set of data, the forgoing method of decrypting the total set of encrypted data, both of the forgoing methods, and/or any of the methods described herein.

Yet another aspect of the present disclosure is a non-transitory computer readable medium having processor-executable instructions embodied therein, wherein execution of the instructions by a processor causes the processor to perform the forgoing method of encrypting a set of data, the forgoing method of decrypting the total set of encrypted data, both of the forgoing methods, and/or any of the methods described herein.

A further aspect of the present disclosure is an electromagnetic or other signal carrying computer-readable instructions for performing the forgoing method of encrypting a set of data, the forgoing method of decrypting the total set of encrypted data, both of the forgoing methods, and/or any of the methods described herein.

An additional aspect of the present disclosure is a computer program product downloadable from a communication network and/or stored on a computer-readable and/or microprocessor-executable medium, characterized in that it comprises program code instructions for implementing the forgoing method of encrypting a set of data, the forgoing method of decrypting the total set of encrypted data, both of the forgoing methods, and/or any of the methods described herein.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or-step-plus-function limitations, unless such a limitation is explicitly recited in a given claim using the phrase "means for."

What is claimed is:

1. A method of encrypting a set of data with a first computing device, the method comprising:
   a) generating a symmetric key with a key generation algorithm;
   b) encrypting the set of data with the symmetric key, thereby converting the set of data into a set of symmetrically encrypted data;
   c) receiving an asymmetric key pair generated by a second computing device from the second computing device over a network;
   d) encrypting the symmetric key with a public key of an asymmetric key pair and encrypting a portion of the symmetrically encrypted data with the public key of the asymmetric key pair, thereby converting the symmetric key into an asymmetrically encrypted symmetric key, thereby converting the portion of the symmetrically encrypted data into a portion of doubly encrypted data, and thereby generating a total set of encrypted data, the total set of encrypted data comprising the asymmetrically encrypted symmetric key, the portion of doubly encrypted data, and a remainder of symmetrically encrypted data, wherein the size of the asymmetric key is larger than the size of the symmetric key, wherein said encrypting the symmetric key and the portion of the symmetrically encrypted data with the public key of the asymmetric key pair significantly increases a randomness of the total set of encrypted data, wherein the total set of encrypted data is sent over a network using an insecure channel; and
   performing a plurality of repetitions of a) to d) on a new set of data with each said repetition,
   wherein said generating the symmetric key in a) includes generating a unique single use symmetric key with each said repetition, and
   wherein said encrypting with the public key in d) includes encrypting with the same public key with each said repetition.

2. The method of claim 1, further comprising decrypting the total set of encrypted data with the second computing device, wherein said decrypting comprises:
   e) decrypting the asymmetrically encrypted symmetric key and the portion of doubly encrypted data with a private key of the asymmetric key pair, thereby converting the asymmetrically encrypted symmetric key into a decrypted symmetric key, thereby converting the portion of doubly encrypted data into a partially decrypted symmetrically encrypted portion of data;
   f) decrypting the partially decrypted symmetrically encrypted portion of data and the remainder of symmetrically encrypted data with the symmetric key.

3. The method of claim 1, further comprising, before b): e) adding salt to the set of data.

4. The method of claim 3, wherein said adding the salt in e) includes adding the salt to the portion of data that becomes the doubly encrypted portion.

5. The method of claim 1, wherein the asymmetric key pair is a Rivest-Shamir-Adelman (RSA) key pair.

6. The method of claim 1, further comprising:
   performing a plurality of repetitions of a) to d) on a new set of data with each said repetition,
   wherein the new set of data in each said repetition includes at least a portion of common data that is common across each said new set of data,
   wherein at least part of the common portion becomes the doubly encrypted portion of each said repetition.

7. A system comprising:
   a processor,
   a memory,
   instructions embodied in the memory and executable by the processor to perform a method of encrypting a set of data, the method comprising:
   a) generating a symmetric key with a key generation algorithm;
   b) encrypting the set of data with the symmetric key, thereby converting the set of data into a set of symmetrically encrypted data;
   c) receiving an asymmetric key pair generated by a second computing device from the second computing device over a network
   d) encrypting the symmetric key with a public key of an asymmetric key pair and encrypting a portion of the symmetrically encrypted data with the public key of the asymmetric key pair, thereby converting the symmetric key into an asymmetrically encrypted symmetric key, thereby converting the portion of the symmetrically encrypted data into a portion of doubly encrypted data, and thereby generating a total set of encrypted data, the total set of encrypted data comprising the asymmetrically encrypted symmetric key, the portion of doubly encrypted data, and a remainder of symmetrically encrypted data, wherein a size of the asymmetric key is larger than a size of the symmetric key, wherein said encrypting the symmetric key and the portion of the symmetrically encrypted data with the public key of the asymmetric key pair significantly increases a randomness of the total set of encrypted data, wherein the total set of encrypted data is sent over a network using an insecure channel; and
   performing a plurality of repetitions of a) to d) on a new set of data with each said repetition,
   wherein said generating the symmetric key in a) includes generating a unique single use symmetric key with each said repetition, and
   wherein said encrypting with the public key in d) includes encrypting with the same public key with each said repetition.

8. The system of claim 7, wherein the method further comprises:
   performing a plurality of repetitions of a) to d) on a new set of data with each said repetition,
   wherein the new set of data in each said repetition includes at least a portion of common data that is common across each said new set of data,
   wherein at least part of the common portion becomes the doubly encrypted portion of each said repetition.

9. A non-transitory computer readable medium having processor-executable instructions embodied therein, wherein execution of the instructions by a processor causes the processor to perform a method of encrypting a set of data, the method comprising:
   a) generating a symmetric key with a key generation algorithm;
   b) encrypting the set of data with the symmetric key, thereby converting the set of data into a set of symmetrically encrypted data;

c) receiving an asymmetric key pair generated by a second computing device from the second computing device over a network;

d) encrypting the symmetric key with a public key of an asymmetric key pair and encrypting a portion of the symmetrically encrypted data with the public key of the asymmetric key pair, thereby converting the symmetric key into an asymmetrically encrypted symmetric key, thereby converting the portion of the symmetrically encrypted data into a portion of doubly encrypted data, and thereby generating a total set of encrypted data, the total set of encrypted data comprising the asymmetrically encrypted symmetric key, the portion of doubly encrypted data, and a remainder of symmetrically encrypted data, wherein a size of the asymmetric key is larger than a size of the symmetric key, wherein said encrypting the symmetric key and the portion of the symmetrically encrypted data with the public key of an asymmetric key pair significantly increases a randomness of the total set of encrypted, wherein the total set of encrypted data is sent over a network using an insecure channel; and performing a plurality of repetitions of a) to d) on a new set of data with each said repetition, wherein said generating the symmetric key in a) includes generating a unique single use symmetric key with each said repetition, and wherein said encrypting with the public key in d) includes encrypting with the same public key with each said repetition.

* * * * *